United States Patent
Zhang et al.

(10) Patent No.: US 10,001,839 B2
(45) Date of Patent: Jun. 19, 2018

(54) GESTURE RECOGNITION OF INK STROKES

(71) Applicant: Lenovo (Singapore) Pte. Ltd., Singapore (SG)

(72) Inventors: Jianbang Zhang, Cary, NC (US); Joshua Neil Novak, Wake Forest, NC (US); Yonggang Zhao, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 341 days.

(21) Appl. No.: 14/815,336

(22) Filed: Jul. 31, 2015

(65) Prior Publication Data
US 2017/0031447 A1   Feb. 2, 2017

(51) Int. Cl.
| | |
|---|---|
| G06F 3/048 | (2013.01) |
| G06F 3/01 | (2006.01) |
| G06F 3/0484 | (2013.01) |
| G06F 3/0488 | (2013.01) |
| G06F 17/24 | (2006.01) |

(52) U.S. Cl.
CPC .......... G06F 3/017 (2013.01); G06F 3/0484 (2013.01); G06F 3/04883 (2013.01); *G06F 3/0488* (2013.01); *G06F 17/242* (2013.01); *G06F 2203/04807* (2013.01)

(58) Field of Classification Search
None
See application file for complete search history.

(56) References Cited

U.S. PATENT DOCUMENTS

2005/0220344 A1* 10/2005 Akiyama ............... G06K 9/222
382/187
2014/0310091 A1* 10/2014 Greenzeiger ...... G06Q 30/0242
705/14.41

OTHER PUBLICATIONS

Akila Varadarajan et al., Analyzing the Efficacy of using digital ink devices in a learning environment, May 14, 2008, Springer Science, vol. 40, pp. 211-239 (Year: 2008).*
John Taschek, Vote Still Out on Tablet PCs, Nov. 7, 2002, Ziff Davis Enterprise (Year: 2002).*

* cited by examiner

*Primary Examiner* — Tam T Tran
(74) *Attorney, Agent, or Firm* — Ference & Associates LLC

(57) ABSTRACT

One embodiment provides a method, including: accepting, on a touch surface, ink stroke data; identifying, using a processor, that the ink stroke comprises a stroke change; determining, using the processor, if the stroke change is within a predetermined zone; interpreting, using the processor, the ink stroke as a gesture command if the stroke change is within the predetermined zone; and executing, based on the gesture command, at least one action. Other aspects are described and claimed.

21 Claims, 4 Drawing Sheets

GESTURE RECOGNITION OF INK STROKES

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box, or pane is presented to the user as an overlay, e.g., a rectangle in a lower portion of a touch screen display or even the full display in certain applications. Within this predetermined area, the user may provide input handwriting strokes, e.g., letters, numbers, characters, symbols, etc. The device employs software that uses the input handwriting strokes, which are generally presented on screen to provide visual feedback to the user, as input by converting the handwriting stroke input locations on the touch screen into machine text according to the language setting of the device. Alternatively, a graphic or image of unconverted handwriting input may be placed into an underlying application, e.g., an image of the user's signature.

When writing using such an application, it is often the case that the drawing, writing, or inking application provides shortcut facilities for the user to enter commands "from the pen," such as "select," "delete," or "insert space," to name just a few. These may be implemented as gesture commands that the user performs by writing in the application window.

BRIEF SUMMARY

In summary, one aspect provides a method, comprising: accepting, on a touch surface, ink stroke data; identifying, using a processor, that the ink stroke comprises a stroke change; determining, using the processor, if the stroke change is within a predetermined zone; interpreting, using the processor, the ink stroke as a gesture command if the stroke change is within the predetermined zone; and executing, based on the gesture command, at least one action.

Another aspect provides an information handling device, comprising: a processor; a touch surface; a memory device that stores instructions executable by the processor to: accept, on the touch surface, ink stroke data; identify that the ink stroke comprises a stroke change; determine if the stroke change is within a predetermined zone; interpret the ink stroke as a gesture command if the stroke change is within the predetermined zone; and execute, based on the gesture command, at least one action.

A further aspect provides a product, comprising: a storage device having code stored therewith, the code being executable by a processor and comprising: code that accepts, on a touch surface, ink stroke data; code that identifies, using a processor, that the ink stroke comprises a stroke change; code that determines, using the processor, if the stroke change is within a predetermined zone; code that interprets, using the processor, the ink stroke as a gesture command if the stroke change is within the predetermined zone; and code that executes, based on the gesture command, at least one action.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
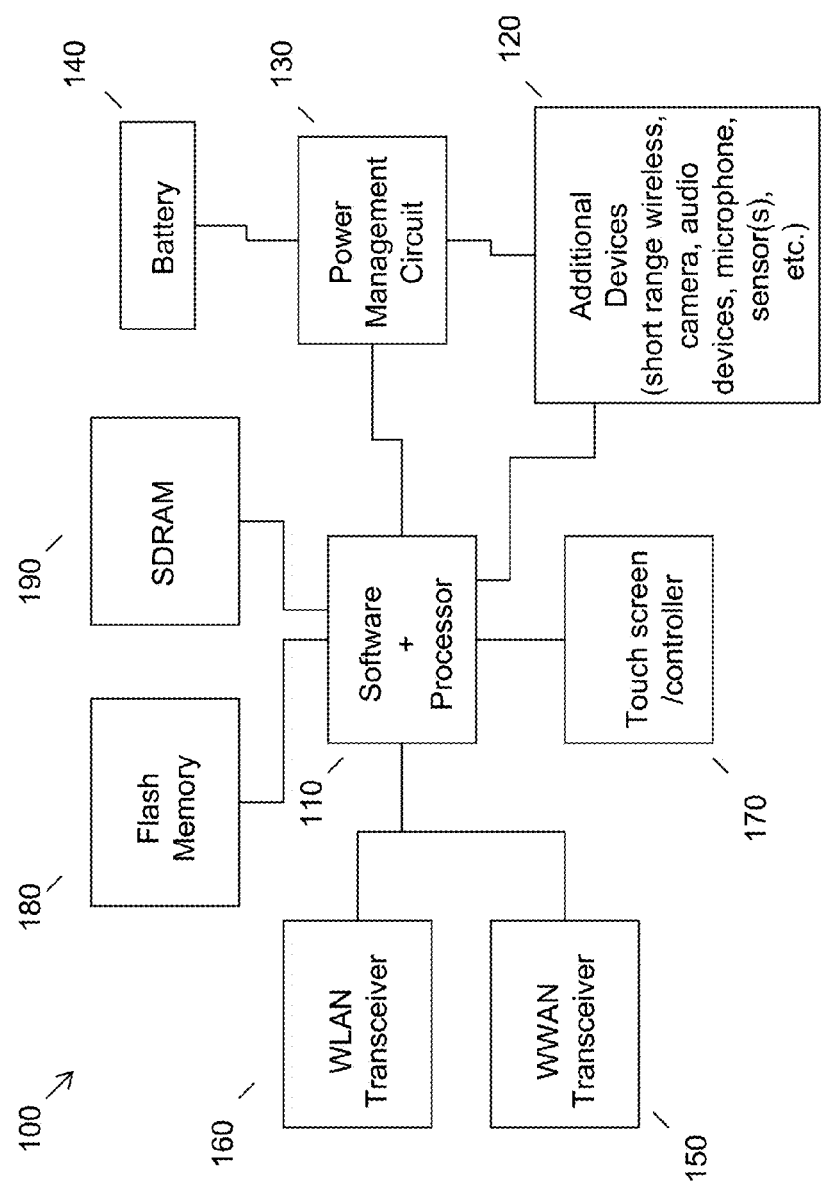
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Ink gesture may be used to perform a variety of tasks. The ink gestures work in a similar way to the more known method of using one's fingers to input gesture commands used on touch devices (e.g., pinch to zoom, pan, etc.). Ink gestures are beneficial, because of their intuitiveness and ease of use for inputting commands to a touch surface. For example, a strikethrough gesture may be used to delete certain text or objects within a document or underlying application, the lasso gesture may be used to select objects (e.g., files, icons, etc.), and many other possible implementations for gesture commands exist.

However, sometimes utilizing a gesture ability of a device or application can be complex or burdensome. This can be due to the limited capability of the gesture recognition engine. For example, if a user does not draw an ink gesture in precisely the right shape, the recognition accuracy will typically decrease (i.e., result in the failure of gesture input command). In addition to failing to identify a gesture, the gesture recognition could also misidentify the gesture (e.g., determining an underline gesture is a strikethrough gesture).

This misidentification may be caused by a variety of things, but one of the most common is the gesture "tail". The terms tail, gesture tail, and stroke change are used interchangeably throughout this document. There are typically two major reasons that cause a user to leave a gesture tail, the first is due to a user's handwriting habit (e.g., the speed, accuracy, pressure, etc.), and the second is because when a user pulls a pen or stylus away the sensitivity of some hardware will lead to extraneous residual ink being left behind. However, both of these circumstances, may result is a low recognition rate.

The technical issue presents problems for a user in that a low recognition rate negatively impacts the ability of a user to benefit from the enhanced capabilities of their devices. Thus, the below embodiments are more convenient in many scenarios of inputting gesture commands via ink input. For example, an embodiment will allow for additional tolerance for ink gesture detection thus granting better overall performance and utilization. In order to allow for the additional tolerance, an embodiment will identify ink if an ink gesture mode has been entered (i.e., toggled from the standard ink entry to a state anticipating gesture command input). For example, ink gesture mode could be activated through graphical user interface (GUI) button, a hardware button click, a pen button hold, pen usage rules (e.g., a user moves less than a specified distance for a specified period of time following an ink stroke input), etc.

Once gesture mode is activated, an embodiment will allow an area of tolerance for a stroke change (e.g., a stroke in an unanticipated direction). This stroke change typically takes place at the end of an ink stroke entry. If the stroke change takes place within a predetermined tolerance zone, the extra data contained within the stroke change is not passed to the recognition engine. The remaining gesture points (i.e., all but the stroke change) are then sent to the recognition engine, thus improving the recognition engine accuracy. However, if the gesture tail is beyond the tolerance zone (i.e., outside of the bounds of the predetermined zone), the ink gesture may be cancelled and act as normal ink stroke data until the user again activates gesture mode. Moreover, in an embodiment, if a stroke has already been determined as gesture, e.g., via use of a gesture mode, after the stroke change is detected, an embodiment may exclude the stroke tail points from the stroke points sent to gesture recognition engine in order to improve the recognition accuracy. Additionally or alternatively, if the gesture tail is beyond the tolerance zone, an embodiment may continue receiving ink input and continue processing the input as gesture input until a gesture is detected or the ink input ceases.

In a further embodiment, the tolerance zones may be adjusted for various reasons. For example, they could be user defined (e.g., an application or system setting determined by a user), or automatically learned over time based on user's the handwriting style. As further discussed herein, the area of the zone determines what is passed to the recognition engine and what is considered extraneous or negligible ink input data.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
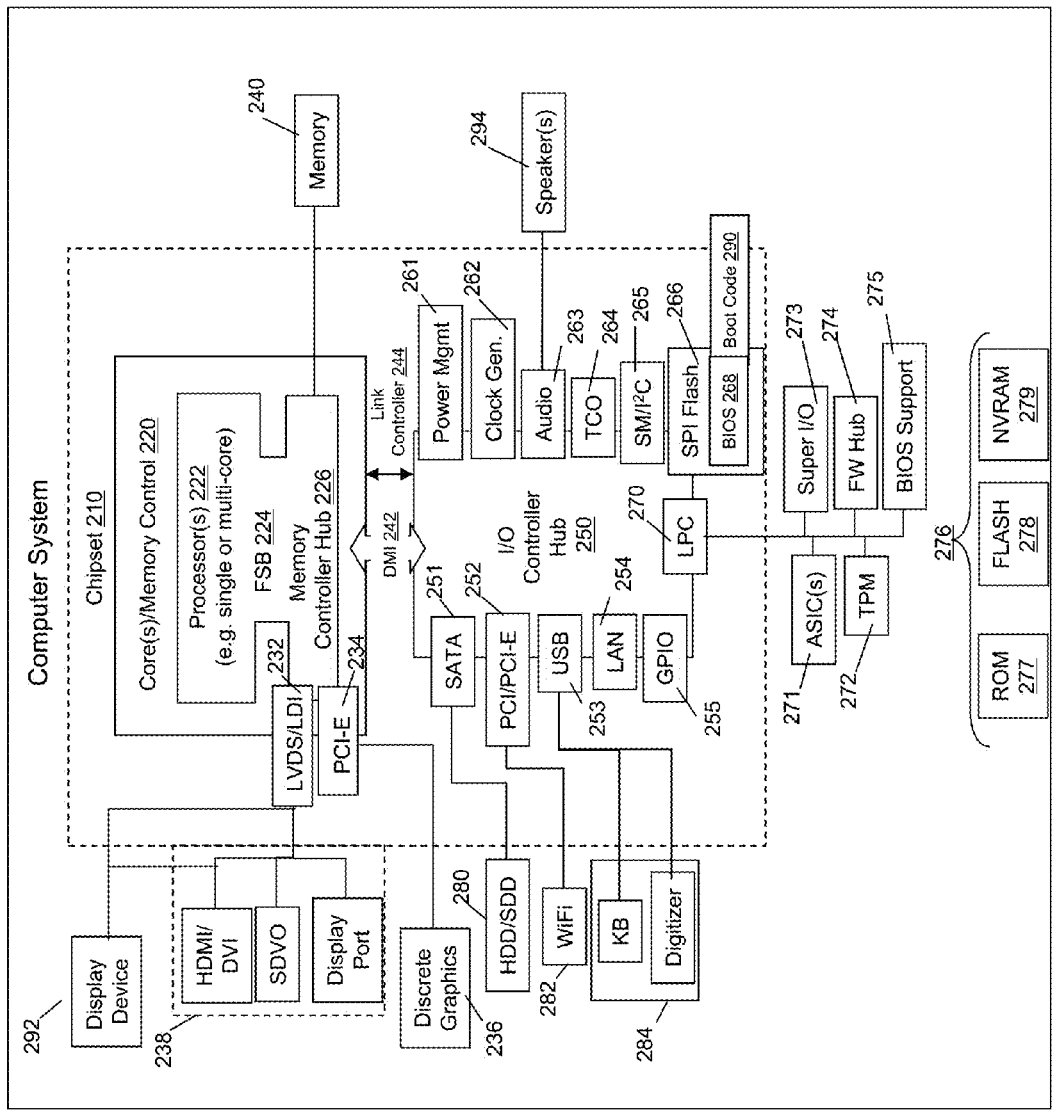
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to input gesture commands via ink input (e.g., figure, pen, stylus, etc.). For example, the circuitry outlined in FIG. 1 may be implemented in a tablet or smart phone embodiment, whereas the circuitry outlined in FIG. 2 may be implemented in a personal computer embodiment.

Figure 3:
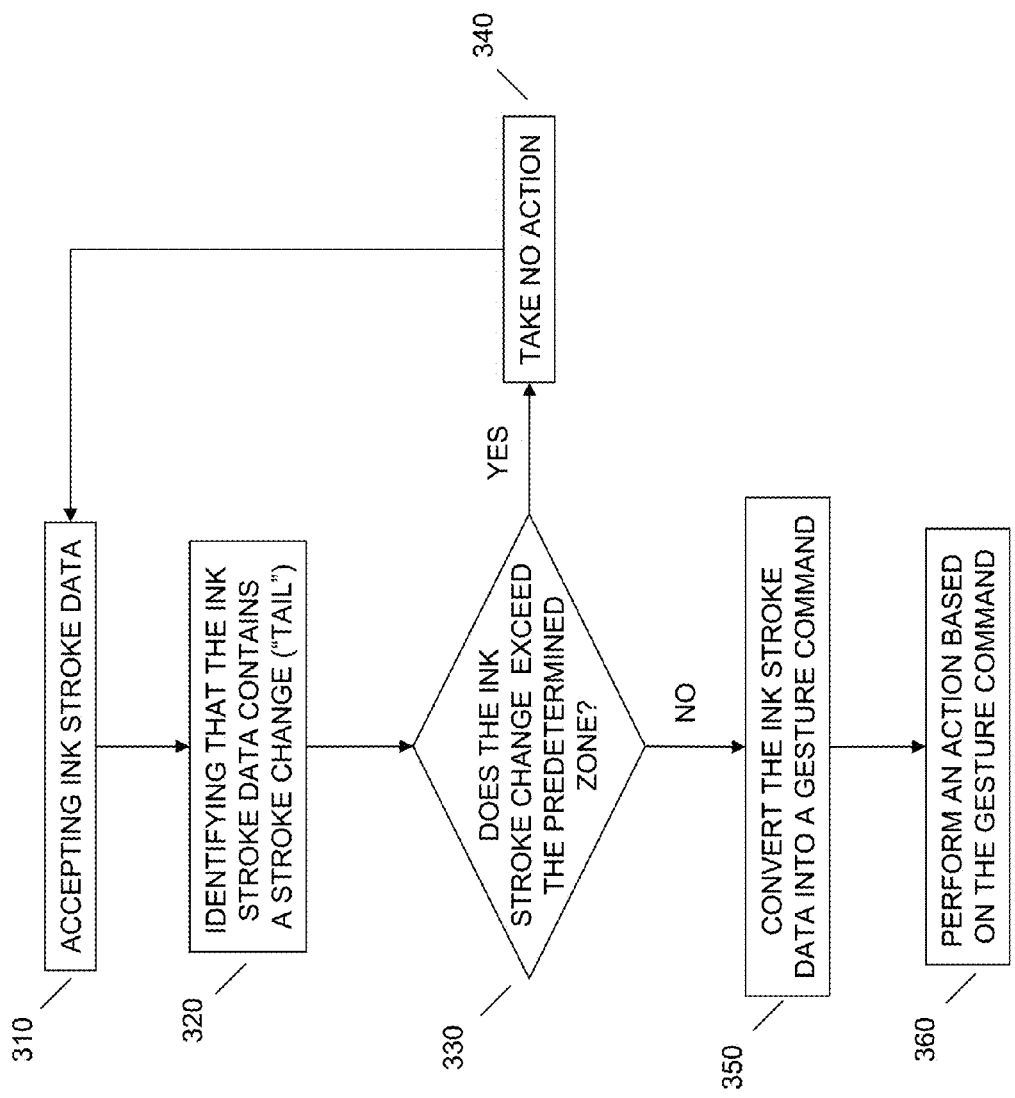
FIG. 3 illustrates an example method of improving gesture recognition of ink strokes.

Referring now to FIG. 3, an embodiment accepts ink stroke data at 310. The ink stroke data may be any data input into an application in the form of a free hand writing on a touch surface (e.g., capacitive, resistive, projected capacitive, surface acoustic wave (SAW), infrared (IR), etc.) such as that shown and described at 170. The ink stroke may be input through any available method (e.g., finger, stylus, digitizer pen, etc.). It should be noted that these are non-limiting examples of stroke input methods and any suitable method of writing input is sufficient.

As an embodiment receives the ink stroke data, it may display the ink stroke data on a display device such as that shown at 292. In one embodiment, the display device and touch input surface may be the same device (e.g., a tablet, smartphone, etc.). This real-time visual feed back helps guide the user during gesture input and ensures a more accurate recognition of the gesture input command.

In one embodiment, a gesture mode may be activated prior to accepting ink stroke data. For example, a user could activate gesture mode via a button within an application GUI. Additionally or alternatively, the button could be a hardware button on a device or stylus (e.g., the click button located on a Bamboo Stylus). BAMBOO STYLUS is a registered trademark of the Wacom Co., Ltd. in the United States of America and other countries. In fact, as would be known by one skilled in the art, any method of user input could be equated to activating a gesture mode (e.g., voice input, keyboard input, pen usage rules, etc.) By activating gesture mode, the device or application preemptively knows that the user is about to enter gesture input at 310, and not traditional ink input. The user of gesture mode thus further increases the accuracy of gesture recognition.

Although the use of gesture mode may increase the accuracy of gesture recognition, it may not be required by an embodiment. Accordingly, an embodiment may, regardless of gesture mode, accept the ink stroke data at 310. Once the ink stroke data is accepted, it is analyzed to identify if a stroke change (i.e., tail) exists at 320. The stroke change is typically a change affecting some characteristic of the ink input (e.g., stroke direction, pen pressure, speed, etc.). The change typically occurs at the end of the ink stroke as the user finishes the input or picks up the pen. The change or tail is typically created as a pen pulls away. This is because the extremely sensitive touch hardware may still sense the pen even when it is not in contact with the touch surface. Thus, although the user is done entering ink input, some residual ink being left behind. Additionally, the stroke change may be caused by the user's writing style (e.g., the quick motion some users have when using a conventional pen and paper, such as during a signature). These however, are non-limiting examples of how a stroke change may occur, and it should be clear to those skilled in the art that any possible cause of stroke change can be addressed by the discussed embodiments.

Once the stroke tail is identified at 320, it is then compared against a predetermined boundary zone at 330. This comparison allows an operating system or application to determine the size of the stroke change. The size of the stroke change is used to indicate if the additional ink is negligible or if it should be considered when determining gesture input. Additional details on how the stroke change is detected and compared are discussed herein, particularly in the description and illustration of FIG. 4.

If a determination is made at 330, that the ink stroke does exceed the predetermined zone, an embodiment takes no action at 340. This is similar to current embodiments, in that the recognition engine is likely to fail to find a matching gesture to associate with the user's ink stroke input. Thus, the presence of a large stroke change (e.g., outside of the boundary zone) results in a typical failed gesture entry. If the gesture is cleared, an embodiment may of course input the ink stroke into an underlying application. This may include conversion of the ink stroke to machine input (typeset) prior to inputting the ink stroke into the underlying application or simply inputting the ink stroke as a picture, graphic, vector drawing, etc. Additionally, if the user continues to input ink stroke data, the cycle beings again with the step of accepting ink stroke data at 310 and identifying a stroke change at 320 and so on.

However, if at 330 an embodiment determines that the stroke change is within the boundary zone, and thus negligible or superfluous, the ink stroke is converted into a gesture command at 350. By way of example, rather than (or in addition to) inserting the ink stroke into an underlying application, an embodiment uses the ink stroke characteristics to convert the ink stroke input into a request for gesture command at 350. Thus, the ink stroke points may be submitted to a gesture recognition engine for processing. The gesture recognition engine may determine a gesture control at 350 (e.g., based on a shape of the ink stroke, its association with one or more other input ink strokes, its timing or context of input, etc.). This permits an embodiment to commit at least one action based on the converting at 360. That is, an embodiment may determine a gesture control or functionality associated with the ink stroke shape, etc.

By way of further example, the action may include executing a gesture function or control associated with the gesture command determined based on a shape of the ink stroke (e.g., deletion of lined through characters, insertion of whitespace, insertion of content in a given location, performing an undo action, etc.). The action may include presenting a notification of the gesture command determined based on a shape of the ink stroke to the user, e.g., before or after the gesture functionality is processed. The action may include pausing a predetermined time prior to executing a gesture function associated with the gesture command determined based on a shape of the ink stroke (e.g., to allow for user confirmation or receiving of a clearing input for a gesture).

Figure 4:
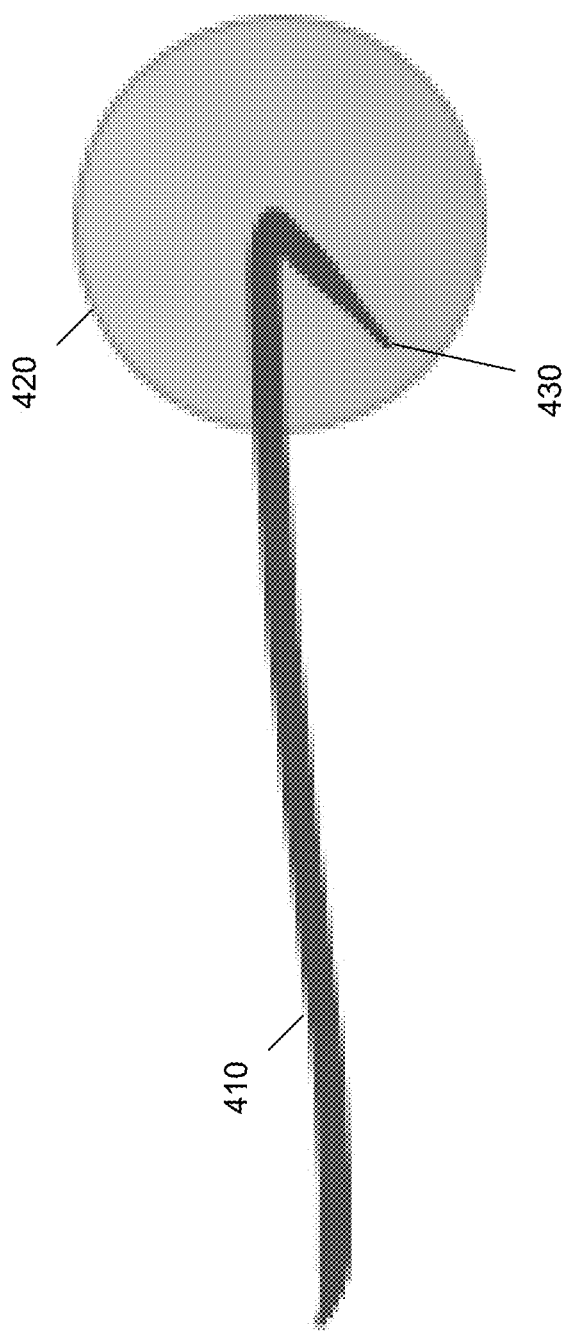
FIG. 4 illustrates an example of ink stroke data within a predetermined zone.

Referring now to FIG. 4, an example of ink stroke data is shown at 410. As discussed herein, the ink stroke data can be entered via a variety of methods (e.g., finger, stylus, digitizer pen, etc.). Typically, the stroke change or tail, shown at 430, takes place at the end of an ink stroke or combination of ink strokes. Once the ink stroke data is received, and the stroke change at 430 is identified, as discussed herein, it is compared against a predetermined zone at 420. As shown in FIG. 4, the stroke change 430 does not exceed the bounds of the predetermined zone boundary shown at 420. Thus, the stroke change would be determined to be negligible and disregarded with respect to the gesture command conversation at 350 of FIG. 3.

An embodiment may allow for modification or refinement of the zone 420 as required for further improvement of the gesture recognition. For example, the zone may be customized based on a user input selection (e.g., an application or system setting where the user sets a parameter (e.g., the diameter) of the zone boundary). Additionally or alternatively, the zone 420 may be customized based on historical user data. For example, if a user has an overly dramatic writing style, they may create longer ink tails. An embodiment may adapt by identifying the statistically determined distance of the user's typical stroke change and adjust the zone accordingly.

Accordingly, as illustrated by the example embodiments and figures, an embodiment provides receiving a user input that activates a gesture mode. A user then inputs ink stroke data that is accepted at a touch surface. During the ink stroke input, or alternatively at the end of the input, a stroke change is identified. The identified stroke change is then compared against a predetermined tolerance zone. If the stroke change is determined to be within the predetermined tolerance zone, it will be disregarded when the ink stroke data is sent to the gesture recognition engine. The recognition engine then converts the ink stroke data (without the stroke change) into a gesture command. The operating system or underlying application then executes an action based on the gesture command.

The various embodiments described herein thus represent a technical improvement to ink stroke applications in that the applications are improved in their ability better recognize and convert ink strokes to gesture input. Using the techniques described herein, a user is permitted to provide gesture input in a convenient and intuitive manner without resulting in a large number of failures due to stray markings.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   accepting, on a touch surface, ink stroke data;
   identifying, using a processor, that at least a portion of the ink stroke comprises a stroke change, wherein the stroke change corresponds to inadvertent ink stroke input;
   determining, using the processor, that the stroke change is within a predetermined zone;
   interpreting, using the processor, the ink stroke as a gesture command when the stroke change is within the predetermined zone, wherein the interpreting comprises excluding data associated with the stroke change prior to identifying a gesture command corresponding to the ink stroke; and
   executing, based on the gesture command, at least one action.

2. The method of claim 1, further comprising accepting, on the touch surface, additional ink stroke data when the stroke change is outside the predetermined zone.

3. The method of claim 2, further comprising:
   identifying, using the processor, that the additional ink stroke data comprises a stroke change;
   determining, using a processor, that the stroke change is within another predetermined zone;
   interpreting, using the processor, the ink stroke data as a gesture command when the stroke change is within the another predetermined zone; and
   executing, based on the gesture command, at least one action.

4. The method of claim 1, wherein the predetermined zone is customizable based on user input.

5. The method of claim 1, wherein the predetermined zone is customizable based on historical user data.

6. The method of claim 1, wherein it is determined the stroke change comprises superfluous ink stroke data.

7. The method of claim 1, wherein it is determined the stroke change takes place at the end of the stroke.

8. The method of claim 1, further comprising: displaying, on a display device, the ink stroke data.

9. The method of claim 1, further comprising activating, based on user input, a gesture mode.

10. The method of claim 1, wherein the interpreting comprises converting the ink stroke into a gesture command.

11. An information handling device, comprising:
    a processor;
    a touch surface;
    a memory device that stores instructions executable by the processor to:
    accept, on the touch surface, ink stroke data;
    identify that at least a portion of the ink stroke comprises a stroke change, wherein the stroke change corresponds to inadvertent ink stroke input;
    determine that the stroke change is within a predetermined zone;
    interpret the ink stroke as a gesture command when the stroke change is within the predetermined zone, wherein the interpreting comprises excluding data associated with the stroke change prior to identifying a gesture command corresponding to the ink stroke; and
    execute, based on the gesture command, at least one action.

12. The information handling device of claim 11, wherein the instructions are further executable by the processor to: accept, on the touch surface, additional ink stroke data when the stroke change is outside the predetermined zone.

13. The information handling device of claim 12, wherein the instructions are further executable by the processor to:
    identify that the additional ink stroke data comprises a stroke change;
    determine that the stroke change is within another predetermined zone;
    interpreting the ink stroke data as a gesture command when the stroke change is within another predetermined zone; and
    execute, based on the gesture command, at least one action.

14. The information handling device of claim 11, wherein the predetermined zone is customizable based on user input.

15. The information handling device of claim 11, wherein the predetermined zone is customizable based on historical user data.

16. The information handling device of claim 11, wherein it is determined the stroke change comprises superfluous ink stroke data.

17. The information handling device of claim 11, wherein it is determined the stroke change takes place at the end of the stroke.

18. The information handling device of claim 11, further comprising:
    displaying, on a display device, the ink stroke data;
    wherein the touch surface and display device are a single device.

19. The information handling device of claim 11, further comprising activating, based on user input, a gesture mode.

20. The method of claim 1, wherein the interpreting comprises converting the ink stroke into a gesture command.

21. A product, comprising:
    a non-signal storage device having code stored therewith, the code being executable by a processor and comprising:
    code that accepts, on a touch surface, ink stroke data;
    code that identifies, using a processor, that at least a portion of the ink stroke comprises a stroke change, wherein the stroke change corresponds to inadvertent ink stroke input;
    code that determines, using the processor, that the stroke change is within a predetermined zone;
    code that interprets, using the processor, the ink stroke as a gesture command when the stroke change is within the predetermined zone, wherein the interpreting comprises excluding data associated with the stroke change prior to identifying a gesture command corresponding to the ink stroke; and
    code that executes, based on the gesture command, at least one action.

* * * * *